United States Patent Office 3,154,611
Patented Oct. 27, 1964

3,154,611
THERMAL CURE OF SPANDEX FIBERS
Kornelius Dinbergs, Cleveland, Ohio, assignor to The
B. F. Goodrich Company, New York, N.Y., a corporation of New York
No Drawing. Filed Mar. 30, 1962, Ser. No. 183,738
4 Claims. (Cl. 264—176)

One important use of natural rubber for many years has been the production of elastic rubber thread. This invention discloses synthetic elastic fibers, and a method for producing them in commercially satisfactory form, which can replace natural rubber in elastic threads. These fibers are prepared from polymeric materials including polyesterurethanes, polyetherurethanes, polyester (amide urethanes) and poly(ester-ether)urethanes. They are finer than natural rubber threads with the same stretch, and are not as easily weakened by heat, body oils, or perspiration. The method involves extruding or spinning a fiber from a polymer melt or a spinning dope solution into air, or relatively inert atmosphere, or into a coagulant bath and curing the fiber, which contains a free radical initiating compound selected from certain benzoyl peroxides, to assist in cross-linking, by means of heating the fibers to temperatures of 80° C. up to about 250° C. for periods of time up to 2 hours. With fibers up to approximately 50 denier, cures can be obtained in the practice of this invention operating in the lower part of the preferred range. With fibers of denier greater than 50 it is advantageous to employ temperatures in the upper part of the preferred range of this invention. Practice of this invention provides curing times for fibers spun from polyurethanes of 1 second, or even less, to two hours depending upon the fiber denier and the method employed to transmit heat to the fiber. Thin fibers cure faster than thick fibers. Heated rolls or baths transmit heat to the fiber faster than do air chambers or ovens. With short cure times of a few seconds to a few minutes it is practical and economical to continuously cure the fiber on even a once through basis. Longer curing cycles, up to 2 hours, are possible without overcuring or scorching the fiber filaments, depending upon the type of equipment employed to effect the thermal cure.

It is desirable to have fiber filaments composed of cured or cross-linked material. As opposed to an uncured fiber, one that is cured will have better resistance to permanent set, will be insoluble in dry cleaning solvents, will exhibit more resilience or snappiness, and have higher modulus and better high temperature (washing and ironing temperatures up to 212° F.) properties.

Elastic thread of good quality is obtained by melt spinning or dope spinning a polyurethane polymer which is a reaction product of a linear polyester or linear polyether having terminal hydroxyl groups with an aromatic diisocyanate in such a mol ratio that the product has essentially no free or unreacted diisocyanate or hydroxyl groups by adding to the polymer from 0.5 to 10.0 parts per 100 parts of polymer of a free radical initiating material selected from the group consisting of benzoyl peroxide, halogen-substituted benzoyl peroxides, and 2,5-dimethylhexane-2,5-di(peroxybenzoate) and submitting the thread to a heat treatment in an air atmosphere.

It is also possible for the polyurethane to be comprised of a hydroxyl-terminated polyester or polyether which is mixed with some free glycol before the final reaction with aromatic diisocyanate. Just enough diisocyanate is then employed to react with essentially all the available hydroxyl groups in the polyester or polyether and the free glycol, and from 0.5 to 10.0 parts of a free radical initiator selected from benzoyl peroxide, halogen-substituted benzoyl peroxides and 2,5 - dimethylhexane - 2,5 - di(peroxybenzoate) per 100 parts of polymer are added. The threadlike filaments formed when the polymer is extruded through the die or spinneret into air or a coagulant fluid are cured by exposure to heat in air to give them superior chemical and physical properties. It is necessary that a minor amount, from 0.5 to 10.0 parts per 100 parts of polyurethane, of a particular free radical initiating material be mixed with the polyurethane polymer before the thread is formed to aid in achieving the desired cure in an air atmosphere.

It is an object of this invention to provide novel elastic fibers and threads of polyurethanes.

Another object is to provide an elastic polyurethane thread that can stand high elongation without breaking.

Another object is to provide methods of producing elastic fibers of polyurethanes by adding a particular free radical initiating material prior to spinning, with the use of heat cures in air atmosphere.

Another object of this invention is to provide an elastic polyurethane fiber that is given improved fiber properties by a commercially realizable curing procedure.

Other objects, advantages, and features of the invention will become apparent from the following description of present preferred embodiments of the invention.

Polyesterurethanes are well known materials. They may be made by the reaction of polyisocyanates, usually diisocyanates, with polyesters, said polyesters being obtained by the reaction of polyols and polybasic acids, for example, glycols and dibasic acids. Molecular weights usually vary from about 10,000 to 40,000 or more depending in part on the type of glycol, dibasic acid, diisocyanate and the time of reaction. Polyesterurethanes can be prepared with a wide range of chemical and physical properties.

Particularly useful polyesterurethanes are obtained when the ratio of diisocyanate to polyester is designed to react essentially all of the free hydroxyl groups that might be present. Materials of this type are described in "Industrial and Engineering Chemistry," 51, 151 (1959), wherein mixed polyesters (80/20 parts by weight ethylene-propylene adipate) are reacted with approximately equimolar amounts of an aromatic diisocyanate, diphenyl methane-p,p'-diisocyanate. Tacky, rubbery gums with good storage life are obtained and these can be further improved by adding 3 parts of a free radical initiator such as dicumyl peroxide and subjecting the mixture to a heat and pressure treatment in a mold, press, or the like to develop non-tackiness, strength, dimensional stability and even better storage life.

United States Patent 2,871,218 describes the preparation of still other polyesterurethanes wherein essentially all the free hydroxyl groups are taken up in the diisocyanate reaction. The materials of the patent have the feature that a small amount of free glycol, from 0.1 to 2.1 mols, is first added per mol of polyester before the ultimate reaction with diisocyanates. As in the polyesterurethanes prepared above, just enough diisocyanate is added to react with esesntially all of the free hydroxyl groups, those in the polyester plus those in the glycol. Polyesterurethanes prepared in this way are non-tacky and dimensionally stable.

The reaction mixture forming the polyesters may contain minor amounts of amino alcohols, diamines, and the like. This will result in the formation of polyester-amides and polyester(amide urethanes). If the amount of diisocyanate employed is just sufficient to react with essentially all of the free hydroxyl groups on the polyester plus any additional free glycol that may be present, the resultant polyester(amide urethanes) are useful in the practice of this invention.

Polyethers, like polyesters, form polymers with polyisocyanates and these are called polyetherurethanes. A preferred class of polyetherurethanes employable in the practice of this invention is that described in United States Patent 2,899,411. These materials comprise reaction products of 1 mol of hydroxyl poly(polymethylene oxide), plus 0.5 to 10.0 mols of free glycol, reacted with just enough aromatic diisocyanate so that essentially no free unreacted isocyanate and hydroxyl groups remain in the product.

Polyether-ester urethanes may also be made by mixing together various polyesters and polyethers, or various glycols, polyalkylene ether glycols and dibasic acids, and then reacting them with different polyisocyanates in amounts such that the diisocyanate groups react with essentially all of the free hydroxyl groups that are present.

As shown in Patent 2,871,218, polyesterurethane polymer employed in this invention may be derived from an essentially linear hydroxyl terminated polyester having a molecular weight between 600 and 1,200 and an acid number less than 10. Molecular weight is determined by assay of the terminal functional groups and is an average molecular weight. The polyester is usually prepared by an esterification reaction of an aliphatic dibasic acid (preferably adipic acid) or an anhydride thereof with a glycol (preferably butanediol-1,4). Molar ratios of more than 1 mole of glycol per mole of acid are preferred to obtain linear chains containing a preponderance of terminal hydroxyl groups.

Suitable polyesters useful for preparing these polyesterurethane polymers are those based on the esterification of dicarboxylic acids of the formula HOOC—R—COOH wherein R is an alkylene radical containing 2 to 8 carbon atoms and including adipic, succinic, pimelic, suberic, azelaic, and sebacic acids and the like and their anhydrides. Preferred glycols for use in preparation of these polyesters are those of the formula $HO(CH_2)_xOH$ wherein $x$ is 4 to 10 and the preferred glycol is butanediol-1,4.

The polyester is reacted with a diphenyl diisocyanate such as diphenyl methane diisocyanate, diphenyl methane-p,p'-diisocyanate, dichlorodiphenyl methane diisocyanate, dimethyl diphenyl methane diisocyanate, diphenyl dimethyl methane diisocyanate, bibenzyl diisocyanate, and diphenyl ether diisocyanate.

The amount of reactants employed may be varied from about 1.1 to 3.1 mols of diphenyl diisocyanate per mol of polyester, which polyester contains from about 0.1 to 2.1 mols of glycol depending upon the molecular weight of the polyester employed. The amount of diphenyl diisocyanate used is in turn dependent upon the amount of free glycol and polyester and should be an amount equivalent to these latter two reactants so that theoretically there are essentially no free unreacted isocyanate and hydroxol groups remaining in the reaction produce. A convenient method for determining how much glycol to add to the polyester prior to reaction of the mixture of polyester and glycol with the diphenyl diisocyanate, is to add enough glycol to the polyester so that the mixture has an average hydroxyl number molecular weight of about 450 to 600. The higher the molecular weight of the polyester, the more glycol will be required to obtain the desired hydroxyl content in the mixture of free glycol and polyester. Such mixtures should have a hydroxyl number from about 185 to 250. To this mixture there is then added an equivalent amount of a diphenyl diisocyanate which will be between about 1.1 and 3.1 mols of diphenyl diisocyanate. Ratios of the three reactants employed to obtain the products of this invention may vary from 1.1 mols of diphenyl diisocyanate, 1.0 mol of polyester and 0.10 mol of free glycol to 3.1 mols of diphenyl diisocyanate, 1.0 mol of polyester and 2.1 mols of free glycol. The amount of diphenyl diisocyanate in each case depends upon the hydroxyl number molecular weight of the polyester and glycol mixture.

If a polyesterurethane is prepared by the above procedure containing approximately 1.3 to 2.0 mols of an aromatic diisocyanate, 1.00 mol of hydroxyl terminated polyester and 0.3 to 1.0 mol of free glycol, so that the mols of diisocyanate equals the sum of the mols of polyester plus free glycol, the polymer can be dissolved in tetrahydrofurane, acetone, dimethylformamide and the like. Approximately 20 to 40 percent total solids solutions of these polymers can be extruded through a die or spinneret 0.010–0.015 inch in diameter to form a fiber. Fibers of this type are soluble in many organic solvents and may not withstand certain dry cleaning procedures, but they do have fair tensile strength and are elastic.

When 3 parts of particular free radical initiating material per 100 parts of polyesterurethane are incorporated in the above polymer melts, fibers can be extruded as above and heat cured for 1 hour at 150°C. in air. These heat cured fibers, when compared to the fibers described above, are stronger, have good permanent set, and are insoluble in dimethylformamide, tetrahydrofurane and acetone as well as perchloroethylene and other solvents normally employed in dry cleaning procedures. Inclusion of a loading pigment such as titanium dioxide, a pigment noted for its whiteness, provides desired color variations in the resulting fiber.

I have now discovered that elastic fibers can be drawn from polyurethane solutions or melts containing particular benzoyl peroxide free radical initiating materials and that excellent fiber properties can be developed if the fibers are subjected to heat cures of from about one second to 3 to 5 minutes at temperatures of 80° C. to 250° C. in air, wherein heat is transferred to the fiber by direct contact or conduction. Periods up to 2 hours for cure are preferred when the heat is transferred to the fibers by the process of convection—as in an air oven or other heating chamber.

I have discovered that not all free radical initiators can be used to activate the heat cure of polyurethane fibers in air. The article in "Industrial and Engineering Chemistry," 51, 151 (1959), referred to above indicates that dicumyl peroxide and benzoyl peroxide, as well as other peroxides and hydroperoxides can be used to initiate cures in these particular materials. The curing processes referred to, however, are closed mold cures under heat and pressure and are conducted in the absence of air.

When dicumyl peroxide is added to a polyesterurethane polymer in the practice of this invention and the polymer is drawn into a fiber, it is found that satisfactory cure of the fiber cannot be obtained in air as in air ovens or air heating chambers. On the other hand, when benzoyl peroxide or halogen substituted benzoyl peroxide or 2,5-dimethylhexane-2,5-di(peroxybenzoate) is employed with the polyurethane polymers described above, excellent fiber cures are obtained in 1 to 2 hours at 150° C. in air ovens and more rapid cures on the order of 1 second to 1 minute can be obtained by running the fibers over metal rolls or drying drums heated to 140° C. to 250° C.

The free radical initiating materials which I have found to be useful in the practice of this invention include benzoyl peroxide, o-, m-, and p-halogen substituted benzoyl peroxides and alkyl diperoxy benzoates. Specific initiators in this group include benzoyl peroxide, 2,4-dichlorobenzoyl peroxide, p-chlorobenzoyl peroxide and 2,5- dimethylhexane - 2,5 - di(peroxybenzoate). When these materials are added to the polyurethane polymer and fibers are formed, it is possible to cure the fibers by exposure to heat alone in air. When other peroxides such as dicumyl peroxide, tertiary butyl perbenzoate, 2,5-dimethyl-2,5-di(t-butylperoxy)hexyne-3, and 2,5 - bis(t-butylperoxy)2,5-dimethylhexane are employed it is necessary to cure the fiber in an inert atmosphere such as nitrogen, a fact which increases the cost of the curing operation. It is generally desired to hold the fiber heat history (total amount of heat a polymer is subjected to in its entire processing from polymerization to final product fabrication and use) to a minimum.

A preferred method of forming polyurethane polymer fibers is to dissolve the polymer in a solvent such as tetrahydrofurane or acetone to form a 20 to 80 percent, preferably 40 to 50 percent total solids solution and then add the free radical initiator to this solution. Compounding pigments, fillers, delusterants, optical brighteners and the like, can be added to the polymer on a mill warmed just enough to insure that the additive will flux into the polymer, usually about 40°–140° C. These materials may be added on a mill before the dope solution is formed.

Dope solutions may be spun in several ways. In one method the dope is extruded through a die or spinneret into a coagulant bath which is miscible with the dope solvent, but is a non-solvent for the dope polymer. An example would be to extrude a dimethylformamide dope into a water coagulant bath. Alternatively, the dope can be spun into air or an inert atmosphere.

Fibers of approximately 240 denier and larger have been formed by melt extrusion of the solid polyesterurethane at about 100° C. to 140° C. Finer denier fibers have been formed by dope spinning into air at about 130° C. or into a coagulant bath. Fibers of varying denier are produced depending upon the size of die or spinneret employed and the amount of draw applied to the newly formed filaments prior to their cure.

These heat cures may be effected in several types of equipment. Fiber may be drawn continuously over a series of heated, polished metal rolls, or it may be wound on large bobbins or storage rolls which can be placed in oven driers or heaters. The atmosphere in the curing chamber is air. In another arrangement fiber may be drawn through a box-like chamber containing banks of infrared lamps. Temperatures in the chamber may be regulated by the rheostat control of the infrared lamps.

It is apparent that since fibers can be cured in times of 5 minutes down to 1 second and less depending upon the free radical initiator employed, the temperature employed, the denier of the fiber employed and the method employed to transmit the heat to the fiber, this process may readily be handled on a continuous basis. The fiber can be carried directly from the spinning station to the curing chamber and then on to further processing, or at any point the process can be conveniently interrupted and the fiber placed on storage bobbins. The curing chambers need not be of excessive size since fibers of this nature can be passed back and forth over guide rolls in very small areas to provide the desired time exposure to the temperature being used.

A screening test to determine if cure has been attained is based on solubility of the fibers in a good solvent for the uncured polymer. State of cure of the fibers may be evaluated by placing a length of fiber in tetrahydrofurane. Uncured fibers of the type concerned in this invention start to swell and dissolve almost at once. If such fibers are well cured they will show no obvious effects from the solvent. If after several hours the solvent is poured off, water is added to the decanted solvent, and no cloudiness, murkiness or turbidity occurs, the fiber was cured. Were the opposite to occur it would indicate that the solvent had dissolved part of the fiber polymer and the fiber could not be considered well cured.

In the following examples, which are illustrative of the scope of this invention, ultimate tensile strength, ultimate elongation and modulus data were obtained on an Instron Tensile Testing Machine. Permanent set was evaluated by stretching a unit length of filament 400% for 24 hours, relaxing for 10 minutes and measuring.

$$\frac{\text{Increase in length}}{\text{Original length}} \times 100 = \text{percent permanent set}$$

EXAMPLE I

Following the teaching of Patent 2,871,218, a supply of polyesterurethane was prepared by mixing 18.4 lbs. (0.0185 mol) of hydroxyl poly(tetramethylene adipate), molecular weight 996, hydroxyl number 108, acid number 2.5 and 0.56 lb. (0.0062 mol) of butanediol-1,4 in a stirred twenty liter kettle and heating at 100° C. to 110° C. at 5–6 mm. pressure for 20 minutes. Then 6.2 lbs. (0.0247 mol) of diphenyl methane-p,p'-diisocyanate were added and the entire mixture was stirred for two minutes and poured into a lubricated container which was fitted with a sealed top and placed in an oven at 135° C. for three hours. When cooled to 25° C., the mass formed a clear, snappy elastomer denoted as polymer I.

EXAMPLE II

Another polyesterurethane polymer was prepared as in Example I by mixing 2323 grams (2.3 mols) of hydroxyl poly (tetramethylene adipate), molecular weight 1010, hydroxyl number 106.1, acid number 2.5, and 207 grams (2.3 mols) of butanediol-1,4 in a heated autoclave with stirring for 15 minutes at 10 mm pressure at 100° to 105° C. Next, 1149 grams (4.6 mols) of diphenyl methane-p,p'-diisocyanate was added and stirred in for 2 minutes. The mixture was poured into lubricated metal trays and held in a 140° C. oven for 3 hours. When cooled to room temperature, the mass formed a clean, snappy, elastomer denoted as polymer II.

EXAMPLE III

Units of one hundred parts of the polyesterurethane polymer of Example I were dissolved in refluxing acetone at 56.5° C. with stirring over a period of 20 minutes to form approximately 40% total solids solutions. To these acetone dopes were added (A) 5 parts benzoyl peroxide, (B) 5 parts dicumyl peroxide, (C) 5 parts tertiary-butyl-perbenzoate, (D) 5 parts 2,5-bis(t-butylperoxy)-2,5-dimethylhexane, and (E and F) no initiator (controls).

Filaments of approximately 300 denier were produced by spinning these dopes through a 0.015 inch diameter die into air at about 150° C. with varying amounts of draw on the filaments. Fibers were wound on storage bobbins and exposed to convection heat in a circulating air atmosphere. Properties and conditions of cure are given in Table 1.

*Table 1*

| Fiber | | Cure at— | | Properties | | | |
|---|---|---|---|---|---|---|---|
| Unit | Denier | Mins. | ° C. | Tensile Strength, p.s.i. | Ultimate Elongation, Percent | 300% Modulus, p.s.i. | Perm. Set Percent |
| A | 256 | 120 | 150 | 8,640 | 675 | 230 | 20 |
| B | 300 | 60 | 155 | Not cured by solvent test. | | | |
| C | 300 | 60 | 152 | | | | |
| D | 300 | 60 | 160 | | | | |
| E | 300 | 60 | 155 | | | | |
| F | 300 | 120 | 155 | | | | |

EXAMPLE IV

Units of one hundred parts of the polyesterurethane polymer of Example II were dissolved in refluxing tetrahydrofurane at 65° C. with stirring over a period of 20 minutes to form approximately 40% total solids solutions. To these solvent dopes were added (A) 5 parts 2,5-dimethylhexane-2,5-di(peroxybenzoate), (B) 5 parts 2,5-dimethyl-2,5-di(t-butylperoxy)hexyne-3, (C) 5 parts benzoyl peroxide, and (D) no initiator (control).

Filaments of varying denier were produced by spinning these dopes through a 0.015 inch diameter die into air at about 150° C. with varying amounts of draw on the filaments. Fibers were wound on storage bobbins and exposed to convection heat in a circulating air atmosphere. Conditions of cure and properties developed are listed in Table 2.

Table 2

| Fiber | | Cure at— | | Properties | | | |
|---|---|---|---|---|---|---|---|
| Unit | Denier | Mins. | °C. | Tensile Strength, p.s.i. | Ultimate Elongation, Percent | 300% Modulus, p.s.i. | |
| A | 165 | 60 | 168 | 8,300 | 440 | 1,860 | |
| B | 300 | 60 | 175 | (¹) | (¹) | (¹) | |
| C | 270 | 90 | 150 | 12,000 | 460 | 2,000 | |
| D | 300 | 60 | 160 | (¹) | (¹) | (¹) | |

¹ Not cured by solvent test.

It is apparent that all peroxides, even though they are all considered to be free radical initiators, will activate the thermal cure of these polyesterurethane polymer fibers to give satisfactory cured fiber properties.

EXAMPLE V

Units of one hundred parts of the polymer Example I were mixed with varying amounts of titanium dioxide by mixing for ten minutes on a rubber mill at 50° C. The mixtures were dissolved in acetone at 56.5° C. and benzoyl peroxide was added. These dopes were spun to filaments of varying denier as in Example III. Units (A) and (B) contained 5 parts benzoyl peroxide plus 5 parts titanium dioxide and, (C) 5 parts benzoyl peroxide plus 25 parts titanium dioxide. Properties and conditions of cure are set forth in Table 3.

Table 3

| Fiber | | Cure at— | | Properties | | | |
|---|---|---|---|---|---|---|---|
| Unit | Denier | Mins. | °C. | Tensile Strength, p.s.i. | Ultimate Elongation, Percent | 300% Modulus, p.s.i. | Perm. Set, Percent |
| A | 390 | 75 | 125 | 7,000 | 600 | 470 | 10 |
| B | 200 | 60 | 150 | 6,000 | 500 | 420 | 8 |
| C | 280 | 120 | 150 | 7,250 | 610 | 475 | 20 |

The titanium dioxide is a pigment added to maintain whiteness in the fiber. The data of Table 3 indicates that with benzoyl peroxide present as a free radical initiator, up to 25 parts of titanium dioxide can be added and fiber cures in air can be readily obtained. About 5 parts of titanium dioxide is usually sufficient to obtain the desired color effect in these fibers.

EXAMPLE VI

Units of one hundred parts of the polyurethane polymer of Example I plus 5 parts titanium dioxide were dissolved in acetone as in Example III and 5 parts of benzoyl peroxide were added. Filaments of varying denier were spun as in Example III. The filaments were drawn across heated plates in air for short intervals of time to evaluate the thermal curing effect on the filaments of heat transmitted directly from heat source to filament by conduction. The solvent screening test indicated full cure was obtained in every case. Conditions of cure and properties are set forth in Table 4.

Table 4

| Fiber | | Cure at— | | Properties | | | |
|---|---|---|---|---|---|---|---|
| Unit | Denier | Secs. | °C. | Tensile Strength, p.s.i. | Ultimate Elongation, Percent | 300% Modulus, p.s.i. | Perm. Set, Percent |
| A | 100 | 1 | 175 | 5,900 | 620 | 380 | 25 |
| B | 116 | 5 | 150 | 6,200 | 640 | 330 | 22 |
| C | 116 | 7 | 150 | 6,700 | 630 | 500 | 24 |
| D | 115 | 1 | 165 | 6,000 | 660 | 540 | |

When contact heating and conduction transfer of heat to the filaments are employed, extremely fast cures of polyurethane filaments of 100–200 denier are practical, even when the masking pigment titanium dioxide is present. When the procedure of this example was followed on a fiber drawn to 220 denier from an acetone solution of 100 parts polymer of Example I plus 5 parts benzoyl peroxide, a 5 second cure at 235° C. produced fiber having 5000 p.s.i. tensile, 480% elongation, a 300% modulus of 400 pounds and a permanent set of 7%.

Polyurethane fibers are elastic in nature. Cures applied to such fibers increase this snappiness, elasticity and resilience. With the practice of this invention, curing times required can be reduced to periods of a few seconds to a few minutes which are commercially realizable periods.

I claim:

1. The process of making a cured elastomeric filament comprising mixing 100 parts by weight of a polyurethane polymer which is a reaction product of materials having terminal hydroxyl groups with an aromatic diisocyanate in such a ratio that the polyurethane polymer contains essentially no free hydroxyl groups, with from 0.5 to 10.0 parts by weight of a free radical initiating material selected from the group consisting of benzoyl peroxide, halogen substituted benzoyl peroxides and 2,5-dimethylhexane-2,5-di(peroxybenzoate), melt extruding said mixture through an orifice to form a monofilament and curing said monofilament by exposing it to heat in the range of 80° C. to 250° C. for from 1 second to 120 minutes in air.

2. The process of making a cured elastic fiber comprising mixing in a solvent therefor 100 parts by weight of uncured polyurethane polymer, said polymer having essentially no free hydroxyl groups, and 0.5 to 10.0 parts by weight of a peroxide selected from the group consisting of benzoyl peroxide, halogen substituted benzoyl peroxides and 2,5-dimethylhexane-2,5-di(peroxybenzoate), melt extruding said mixture through an orifice to form a monofilament and curing said monofilament by exposing it to heat in the range of 80° C.–250° C., for from one second to 120 minutes in air.

3. The process of making a cured elastomeric thread comprising dissolving 100 parts by weight of an uncured polyurethane polymer, which is an reaction product of a material containing hydroxyl groups, said material being selected from the group consisting of polyesters, polyesteramides, polyethers and polyesterethers, plus free glycols, with a sufficient amount of an aromatic diisocyanate to react with essentially all of the hydroxyl groups present, in a solvent therefor, adding to the polyurethane polymer solution from 0.5 to 10.0 parts by weight, based on the weight of said polyurethane polymer, of a free radical initiator selected from the group consisting of benzoyl peroxide, halogen substituted benzoyl peroxides and 2,5-dimethylhexane - 2,5 - di(peroxybenzoate), extruding said solution through an orifice to form a monofilament, and curing said monofilament by exposing it to heat in the range of 80° C. to 250° C. for from 1 second to 120 minutes in air.

4. The process of making a cured filament comprising preparing a 40% to 50% by weight solution in a solvent selected from the group consisting of acetone, tetrahydrofuran and dimethylformamide, of a polyurethane polymer which is a reaction product of a material containing hydroxyl groups, said material being selected from the group consisting of polyesters, polyesteramides, polyethers, and polyesterethers, plus free glycols, with a sufficient amount of an aromatic diisocyanate to react with essentially all of the hydroxyl groups present, adding from 0.5 to 10.0 parts by weight per 100 parts by weight of said polyurethane polymer of a material selected from the group consisting of benzoyl peroxide, halogen substituted benzoyl peroxides and 2,5-dimethylhexane-2,5-di - (peroxybenzoate), extruding said polymer solution through an orifice to form a monofilament and curing said monofilament by exposing it to heat in the range of 80° C. to 250° C., for from one second to 120 minutes in air.

References Cited in the file of this patent

UNITED STATES PATENTS

| | | |
|---|---|---|
| 2,642,403 | Simon | June 16, 1953 |
| 3,047,356 | Polansky | July 31, 1962 |